Inventors
Lloyd G. Miller
Ernest W. Stacey
By their Attorney

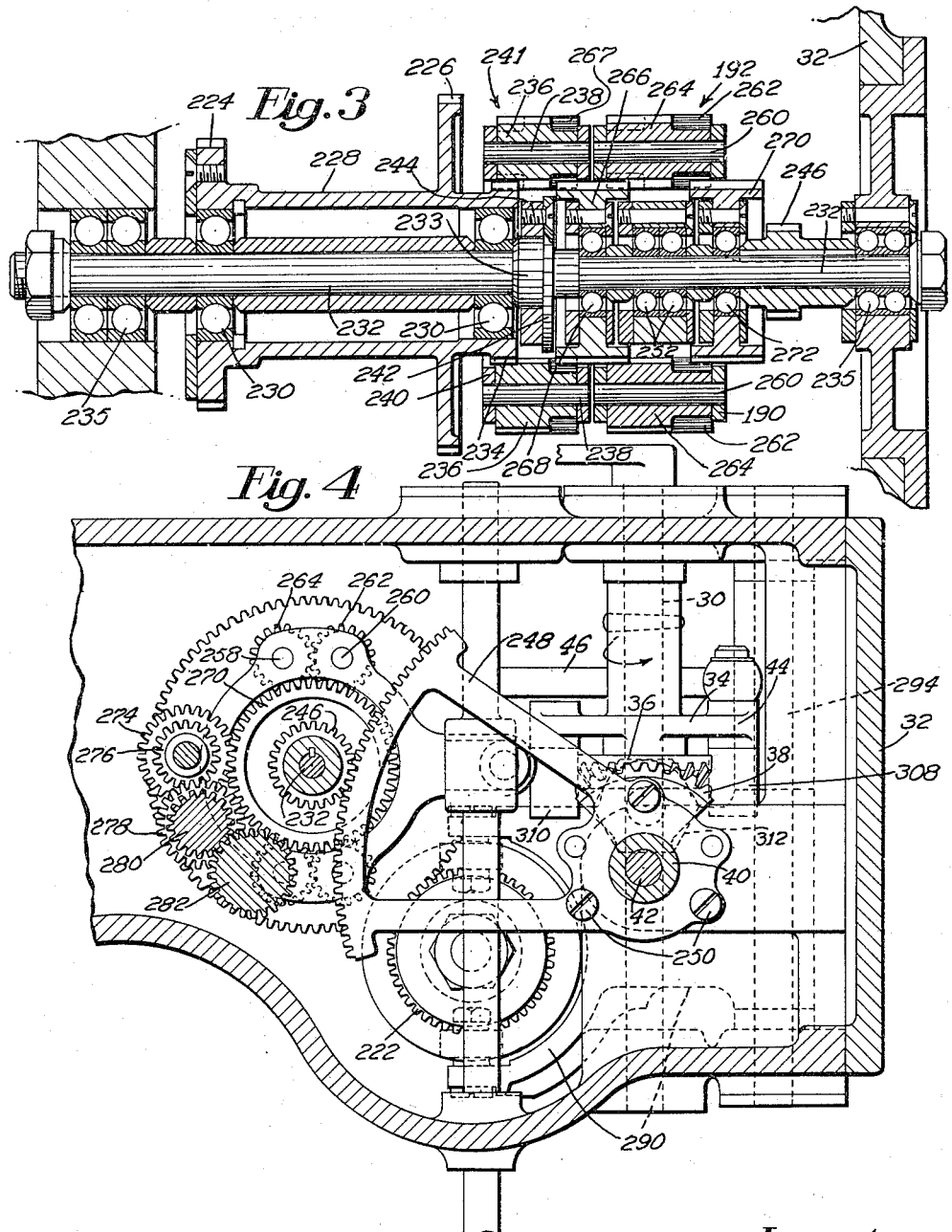

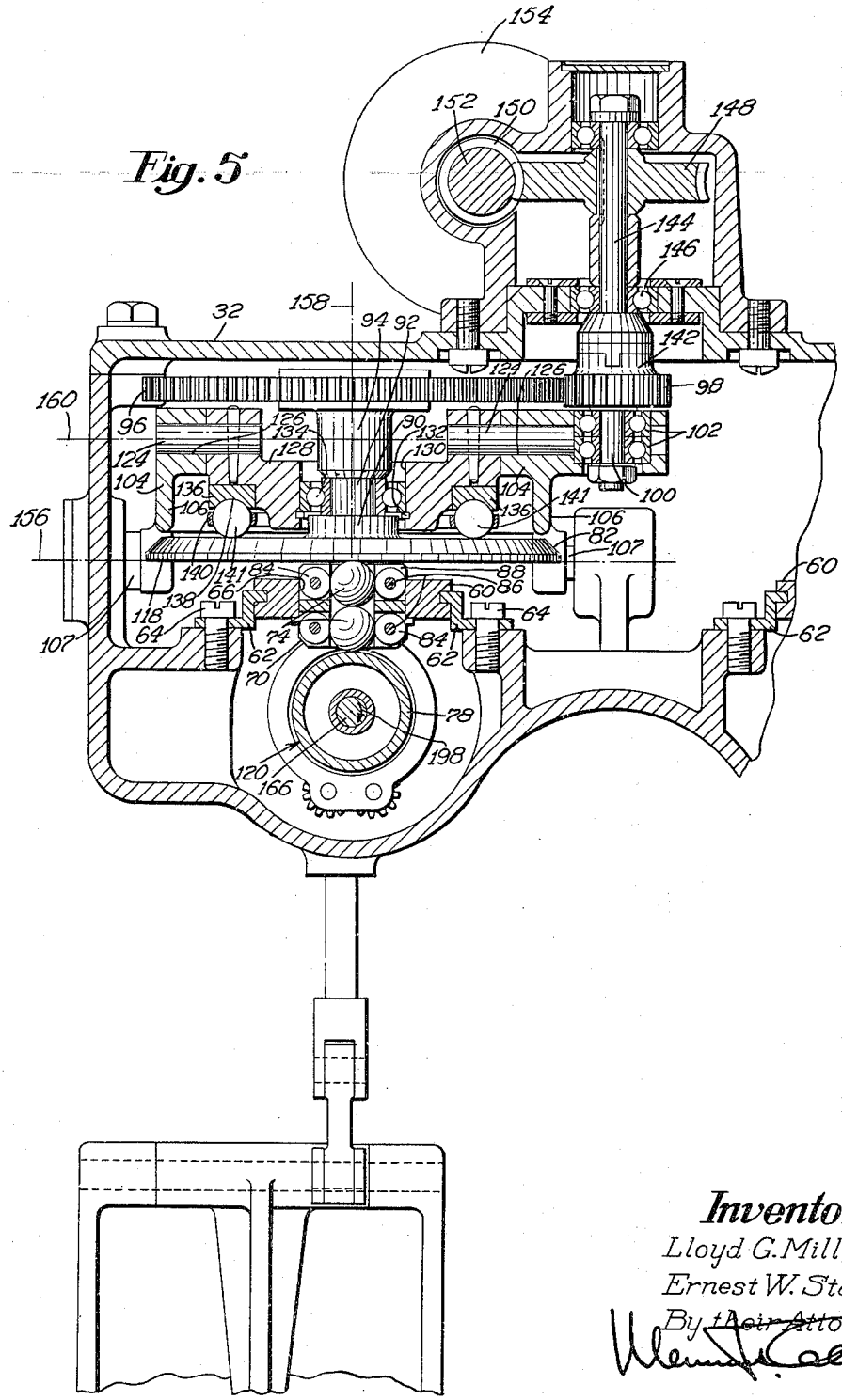

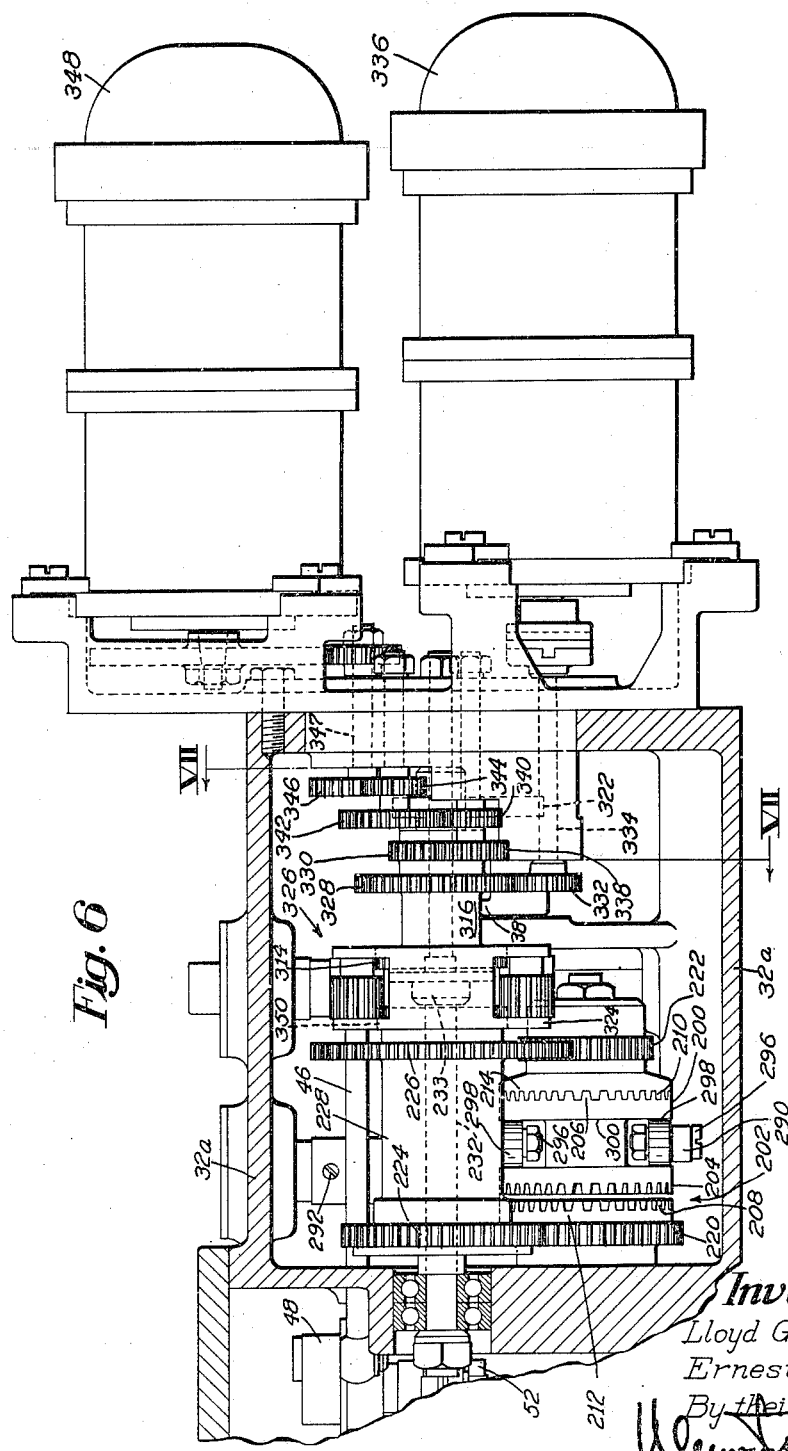

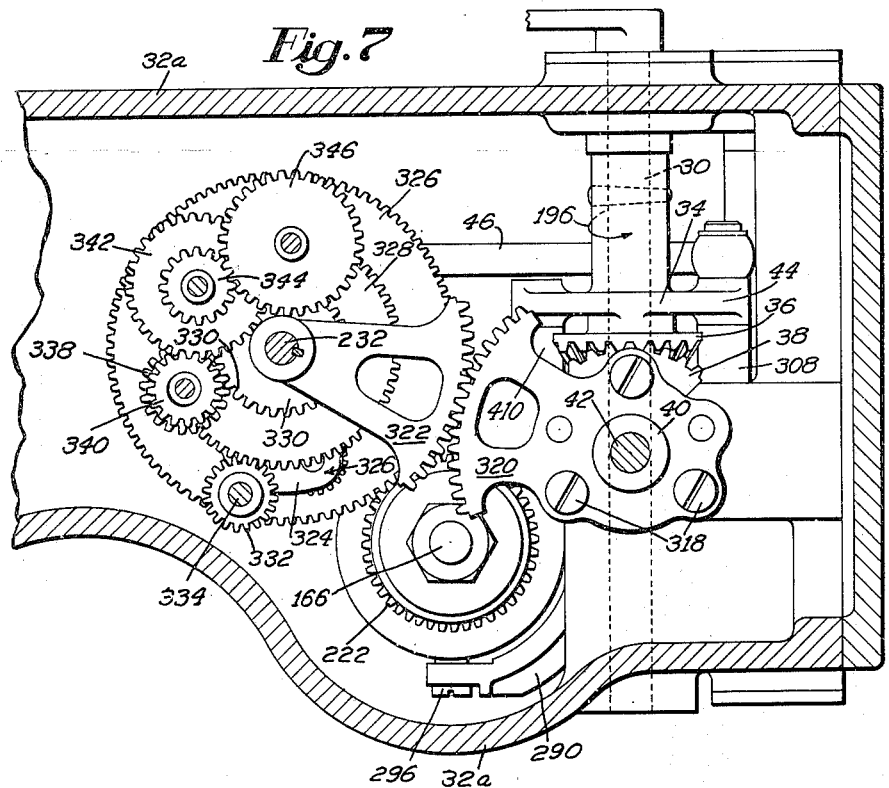

Patented Nov. 8, 1949

2,487,256

UNITED STATES PATENT OFFICE 2,487,256

RATE CONTROL DEVICE

Lloyd G. Miller and Ernest W. Stacey, Beverly, Mass., assignors to United Shoe Machinery Corporation, Flemington, N. J., a corporation of New Jersey Application October 13, 1947, Serial No. 779,472

7 Claims. (Cl. 74—675)

This invention relates to rate control mechanism and is illustrated as embodied in a variable speed drive for use in an "aided tracking device" for effecting movement in azimuth or elevation of guns secured to turrets such as disclosed, for example, in applications for United States Letters Patent, Serial Nos. 707,216, filed November 1, 1946, and 30,328, filed June 1, 1948, in the names of Ernest W. Stacey et al. and Walter E. Naugler et al., respectively.

As disclosed in said applications, there are mounted in the turrets motors for driving the turrets in azimuth and elevation, the speeds of said motors being controlled by mechanism comprising pairs of hand grips which are moved as units about axes disposed at right angles to each other, by gunners housed in said turrets.

It is an object of the present invention to provide an improved aided tracking device which may be readily incorporated in the above referred to turrets to improve their effectiveness.

The present invention consists in the novel features hereinafter described, reference being had to the accompanying drawings which show embodiments of the invention selected for purposes of illustration, said invention being fully disclosed in the following description and claims.

In the accompanying drawings,

Figs. 2, 3 and 4 are vertical sections on lines II—II, III—III, IV—IV, respectively, of Fig. 1;

Fig. 5 is a vertical section on line V—V of Fig. 2;

Fig. 6 is a plan view, partly broken away and partly in section, of the above aided tracking device modified for use in an electrically driven turret disclosed in said application Serial No. 30,328; and Fig. 7 is a section on line VII—VII of Fig. 6.

The invention is illustrated as embodied in a rate control device forming parts of aided tracking units for use in armed turrets (not shown) such as disclosed in said applications Serial Nos. 707,216 and 30,328. As disclosed in the above-mentioned applications receivers (not shown) of a pair of automatic guns are secured to each of the turrets, movement of the turrets and, accordingly, the guns in azimuth and elevation being controlled by a gunner by the use of a pair of grips (not shown) rotatable about one axis to effect movement of the turret in azimuth and about a second axis, which is disposed at right angles to said one axis, to effect movement of the turret in elevation.

In the illustrative rate control device, which may be referred to as an aided tracking box, for use in the turrets disclosed in said applications Serial Nos. 707,216 and 30,328, there is a shaft 30 (Figs. 1, 2, 4, 6 and 7) which is rotatable in response to rotation of the grips about one of said axes, and a similar shaft (not shown) which is rotatable in response to rotation of the grips about the other axis. Since the rate control device for moving the turret in azimuth is substantially identical with the rate control device for moving the turret in elevation, only one of said devices will be described.

Figure 1:
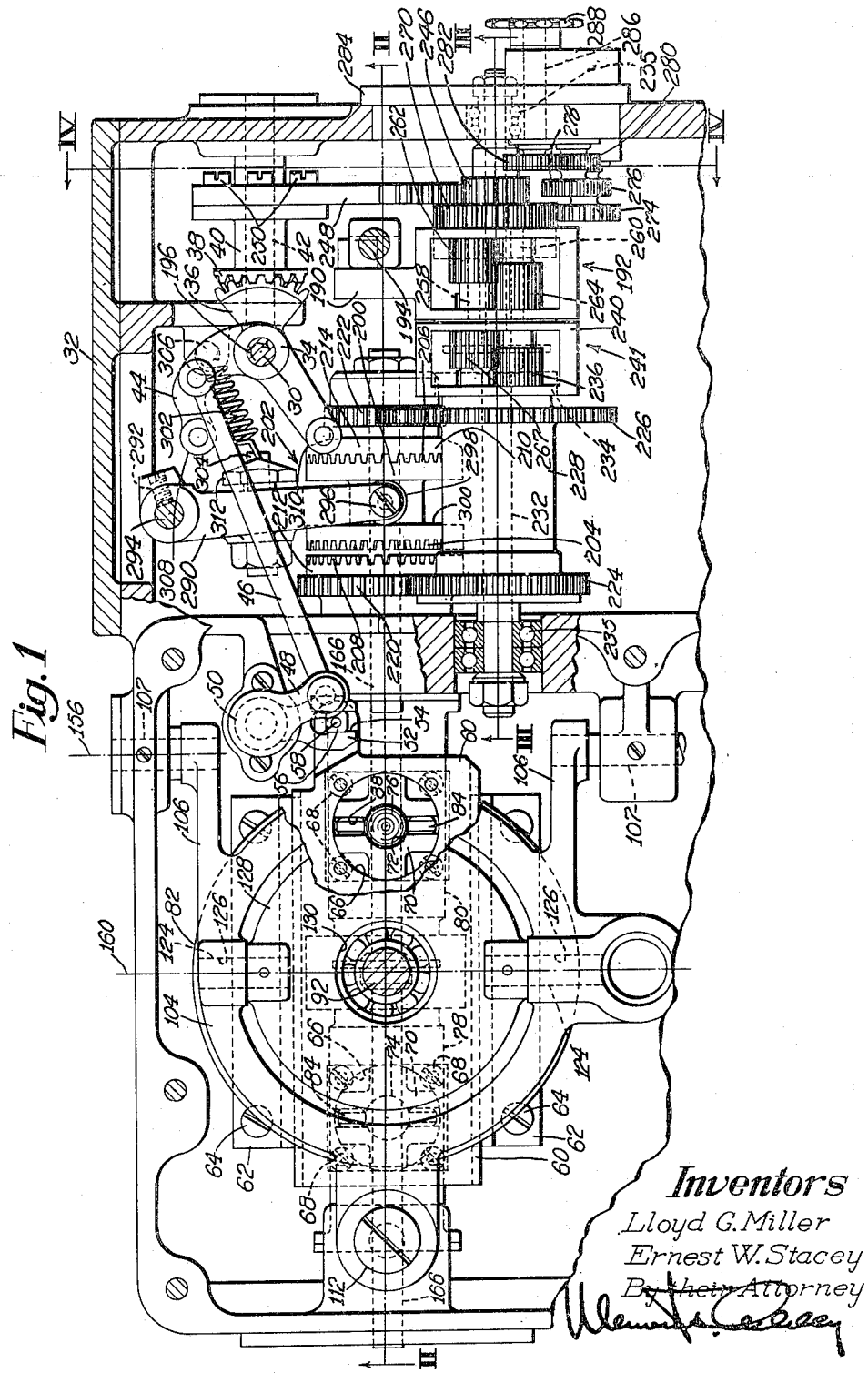
Fig. 1 is a plan view, partly broken away and partly in section, of an illustrative aided tracking device for use in the hydraulically driven turret disclosed in said application Serial No. 707,216.
Figure 2:
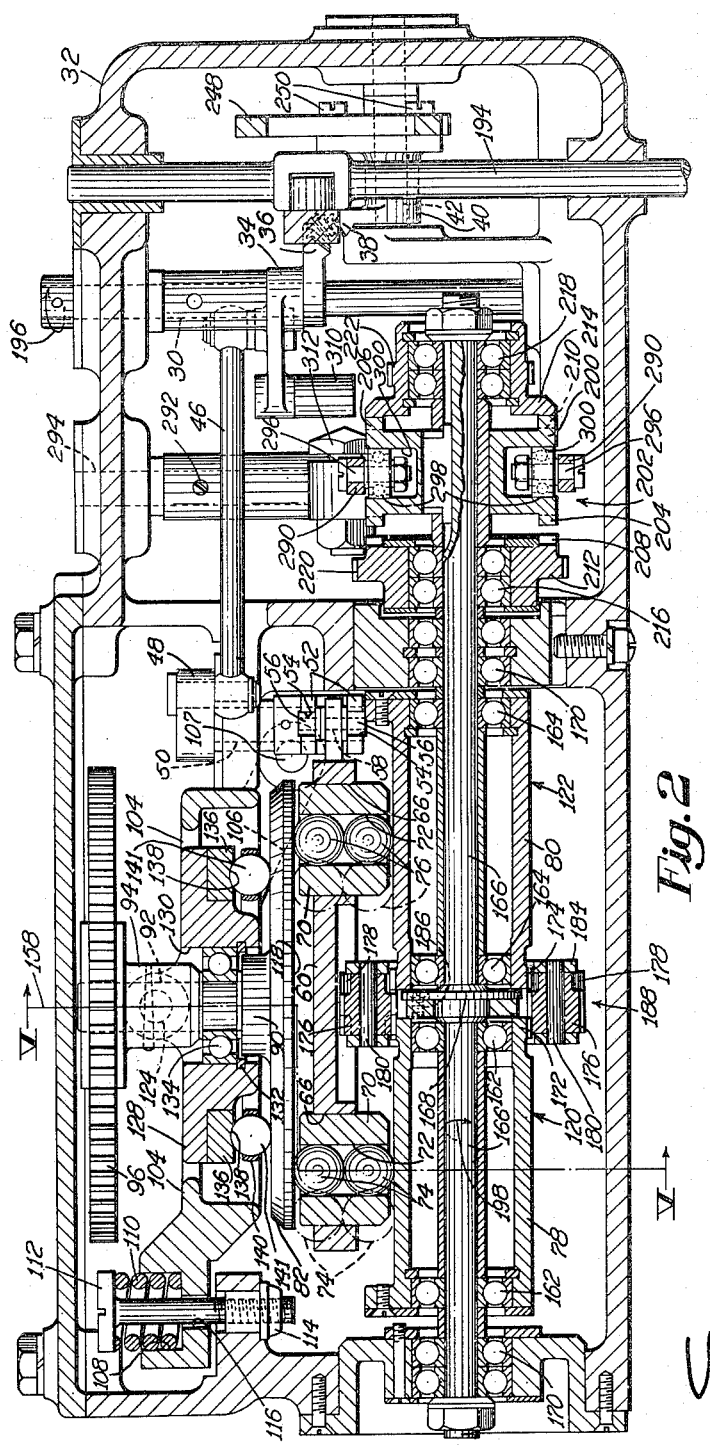

The shaft 30 is rotatably mounted in a box or housing 32 (Figs. 1, 2, 3, 4 and 5), 32a (Figs. 6 and 7) and has secured to it a multi-arm lever 34 having a gear segment 36 which meshes with a bevel gear segment 38 forming part of a sleeve 40 (Figs. 1, 2 and 4) rotatably mounted on a fixed stud 42 secured to the housing. Pivotally connected to a rearwardly extending arm 44 (Figs. 1, 4 and 7) of the lever 34 is a rod 46, the left end of which as viewed in Figs. 1 and 2 is pivoted to an arm 48 (Figs. 1, 2 and 6) secured to the upper end of a shaft 50 journaled in bearings of the box 32. Pinned to the lower end of the shaft 50 is a bifurcated lever 52 provided with slots 54 in which slidingly fit blocks 56 (Figs. 1 and 2) mounted upon a pin 58 secured to one end of a control or regulating slide 60 (Figs. 1, 2 and 5) movable along angular guides 62 which are secured by screws 64 to and, in effect, form part of the box 32. The slide 60 has formed in it spaced openings 66 in which are secured by screws 68 (Fig. 1), retainers 70, each provided with a vertical recess 72 for receiving hardened steel balls 74 (Figs. 2 and 5), 76 (Figs. 1 and 2), the lower balls at all times being pressed against freely rotatable cylinders 78, 80 hereinafter described and the upper balls being engaged with considerable pressure by a constantly rotating disk 82. In order to reduce friction of the balls 74, 76 in the vertical recesses 72, each of the retainers is provided with ball engaging rollers 84 which are rotatably mounted upon pins 86 (Fig. 5) secured to the retainers and extend across slots 88 in which the rollers are positioned. The retainers 70 may be considered as part of the slide 60 although the balls 74, 76, which may be referred to as driving units or drives, are loose in the retainers 70, they are confined in their operative positions in said retainers by the cylinders 78, 80 respectively and the disk 82 and may be described as carried by the slide 60.

The disk 82 is provided with a boss 90 (Figs. 2 and 5) formed integral with a vertical shaft 92 and mounted upon and pinned to said shaft is a hub 94 of a gear 96 which meshes with a continuously rotating gear 98 (Fig. 5) secured to a stub shaft 100 supported in bearings 102 mounted in a carrier 104, extensions 106 of which are pivoted upon studs 107 secured to the box 32. The carrier 104 is of annular shape and has at its left end as viewed in Fig. 2, a recess 108 (Fig. 2) for receiving a coil spring 110. A screw 112 which is threaded into a nut 114 secured to the box 32 passes through a recess 116 of the carrier 104 and has a head which is in engagement with the upper end of the spring 110 positioned in the recess 108. The carrier 104 is constantly urged counterclockwise as viewed in Fig. 2 about the studs 107 by the spring 110 to force, through mechanism hereinafter described, a flat or planar work engaging face 118 of the disk 82 against the upper balls 74, 76 in the control slide 60 and the lower balls 74, 76 against cylindrical driving faces 120 (Figs. 2 and 5), 122 (Fig. 2) of the cylinders 78, 80, respectively.

Secured to fulcrum pins 124, rotatably mounted in alined bores 126 (Figs. 1 and 5) of the carrier 104, is a tilting plate 128 having at its central portion a bore 130 in which is positoned by a snap ring 132 (Figs. 2 and 5) a ball bearing 134, an inner race of which fits between the hub 90 of the disk 82 and the hub 94 of the gear 96. The tilting plate 128 has secured to it a thrust bearing ring 136 which is made of hardened steel and has an annular groove 138 for receiving balls 141 retained by a cage 140.

Formed integral with the driving gear 98 is the lower half of an Oldham coupling 142 (Fig. 5), the upper half of said coupling being secured to a vertical shaft 144 journaled in bearings 146 mounted in an upstanding portion of the front of the box 32. Keyed to the shaft 144 is a worm gear 148 meshing with a worm on a shaft 152 of a constant speed motor 154.

Rotation of the motor shaft 152 at a constant speed effects, through the Oldham coupling 142 and the gear 98, rotation of the gear 96. The spring 110 acting through the carrier 104 and the tilting plate 128 causes the face 118 of the disk 82 to be forced with self-alining pressure against the upper balls 74, 76 mounted in the control slide 60. The disk 82 as well as the balls 74, 76 are made of hardened steel, the construction and arrangement being such that the sets of balls constitute drives or driving units for actuating without any substantial slippage the cylinders 78, 80 in response to rotation of said disk. It will be noted that an axis 156 (Figs. 1 and 5) about which the carrier 104 is pivoted is arranged at one side of the disk 82 and in the general plane of the driving face 118 of the disk, the construction being such that any slight movement of the carrier about the axis 156 will be lengthwise of an axis 158 (Figs. 2 and 5) of rotation of the disk. Accordingly, there will not be any appreciable component of movement of the disk 82 in the direction of movement of the control slide 60 during the slight pivoting of the tilting plate 128 upon which the disk is rotatably mounted. The plate 128 may be described as being tiltable about an axis 160 (Figs. 1 and 5) parallel to the axis 156 and extending through and at right angles to the axis 158 of rotation of the disk 82. By providing the above construction, the disk 82 will be forced with equalized pressure against the upper balls 74, 76 irrespective of the transverse position of the balls along the driving face 118 of the disk. The ball drives together with the cylinders 78, 80 may be referred to as a drive.

The cylinders 78, 80 are rotatable upon bearings 162, 164 (Fig. 2) mounted upon a shaft 166, parts of which are secured together by a collar 168, said shaft being supported for rotation in ball bearings 170, mounted in brackets forming, in effect, part of the box 32. Formed integral with the cylinders 78, 80 at their adjacent ends are gears 172, 174 which mesh with input pinions or gears 176, 178, respectively rotatable upon pins 180, 182 carried by a cage 184 which is secured by screws 186 to a flange of the collar 168, the pinions 176, 178 and the cage 184 forming a differential 188 for algebraically adding the angular movements of the cylinders 78, 80 and imparting the resultant movement to the shaft 166 which through mechanism hereinafter described displaces a cage 190 of a differential 192 which is universally connected to a push-pull rod or rate control transmitting or power regulating member 194 corresponding to rods 172, 180 disclosed in said application Serial No. 707,216 for regulating a hydraulic motor (not shown).

When the grips (not shown) which are operatively connected to the shaft 30 are in neutral position the slide 60 is in its full line position shown in Fig. 2, the balls 74, 76 being equally spaced from the axis of rotation 158 of the disk 82. The lower balls 74, 76 thus positioned rotate in opposite directions at the same speed and, accordingly, rotate the cylinders 78, 80 in opposite directions at the same speed with the result that the cage 184 of the differential 188 and, therefore, the shaft 166 remains stationary. Movement of the shaft 30, which is operated by the grips, in the direction indicated by arrow 196 (Figs. 2 and 7), for example, from its neutral position causes movement of the slide 60 to the left (Fig. 2), the balls 74, 76 being moved to their dot-and-dash line positions. When the slide 60 is thus positioned the balls 74 will rotate at a greater speed than the balls 76 with the result that the cylinder 78 rotates much faster than the cylinder 80 and the shaft 166 moves in the direction indicated by arrow 198 (Figs. 2 and 5). Should the grips be displaced an equal amount in the opposite direction from their neutral positions the relative positions of the balls 74, 76 would be reversed and the shaft would rotate at the same speed in the opposite direction.

Keyed for longitudinal displacement on the shaft 166 is a driving member or slide 200 (Figs. 1, 2 and 6) of a clutch 202 having clutch teeth 204, 206 constructed and arranged to be moved selectively into driving relation with clutch teeth 208, 210, respectively of sleeves 212, 214 which are rotatable on bearings 216, 218 (Fig. 2) supported by the shaft 166. The sleeves 212, 214 are provided with gears 220, 222 (Figs. 1, 2, 6 and 7) which mesh with gears 224, 226 (Figs. 1, 3 and 6) formed upon a spool 228 mounted upon bearings 230 (Fig. 3) supported by a shaft 232 which has secured to it a collar 233 and is supported for rotation upon bearings 235 (Figs. 1 and 3) mounted in the box 32. The spool 228 also has formed integral with it a gear 234 meshing with pinions 236 mounted for rotation upon pins 238 (Fig. 3) carried by a cage 240 of a differential 241. The collar 233 has formed integral with it a flange 242 which is secured by screws 244 to the cage 240 and keyed to the shaft is a gear 246 which meshes with a gear segment 248 secured by screws 250 to the sleeve 40.

Rotatably mounted upon bearings 252 (Fig. 3) supported by the shaft 232 is the cage 190 of the differential 192 which carries pins 258, 260 (Figs. 1 and 4) upon which are mounted pinions 262, 264, respectively, the pinions 264 meshing with a gear 266 (Fig. 3) which is rotatably mounted upon bearings 268 supported by the shaft 232 and also meshes with the pinions 267 (Figs. 1 and 3) rotatably mounted upon pins 269 carried by the differential 241. The pinions 262 of the differential 192 mesh with a back feed gear 270 (Figs. 1, 3 and 4) rotatable upon bearings 272 (Fig. 3) supported by the shaft 232.

The back feed gear 270 is operatively connected through a train of gears 274, 276, 278, 280 and 282 (Figs. 1 and 4), mounted in a cap 284 (Fig. 1) secured to and forming part of the box 32, with a shaft 286 rotatably mounted in the cap and having secured to it a sprocket 288 which is rotated a predetermined number of degrees for each degree of movement in azimuth or elevation of the gun carrying turret (not shown).

When the guns of a turret are following a target the driving member 200 of the clutch 202 is normally positioned as best illustrated in Figs. 1 and 2 with its clutch teeth 206 in engagement with the clutch teeth 210 of the sleeve 214, by a bifurcated arm 290 secured by one or more screws 292 to a vertical shaft 294 fulcrumed in bearings of the box 32, branches of the bifurcated arm having secured to them pins 296 carrying rolls 298 which engage in a circumferential groove 300 of the clutch member 200. The bifurcated arm 290 is constantly urged to the position shown in Fig. 1 by a spring 302, one end of which is secured to an adjustable stud 304 carried by the arm and the other end of which is attached to a stud 306 on the box 32.

When the armed turret is swung through a large arc while the guns are being initially trained on the target it is desirable that the rod 194 be displaced its maximum amount of one inch and held there, thus insuring that the turret be moved at a maximum speed of 45° a second. The speeding up of the turret for the above purpose is quickly effected by moving the clutch slide 200 to the left as viewed in Figs. 1 and 2 thereby causing the clutch teeth 204 of the slide to mesh with the clutch teeth 208 of the sleeve 212, the gear 220 of which meshes with the gear 224 of the spool 228 as above described. Such shifting of the clutch slide 200 will result in changing the speed ratio between the shafts 166 and 232 of mechanism for operatively connecting the balls 74, 76 to the rate control transmitting member 194.

When the grips are angularly displaced in azimuth or elevation up to 26⅔° from its neutral position, the clutch teeth 206 of the driving clutch member 200 is in meshing engagement with the clutch teeth 210 of the sleeve 214, and the gear 222 of the sleeve is in driving relation with the gear 226 of the spool 228, the construction and arrangement being such that the push-pull rod 194 for controlling the operation of the hydraulic motor (not shown), is displaced up to .444" from its neutral position and the turret is thus rotated up to 20° per second in either azimuth or elevation.

In order to expedite the initial training of the guns of the turret on a target located a considerable distance from the line of sight of the guns, the drive gear ratio of the rate control mechanism is automatically increased by causing as above described the clutch teeth 204 of the clutch member 200 to be moved into meshing engagement with the clutch teeth 208 of the sleeve 212 when the grips are displaced more than 26⅔° in either direction from neutral position. The arm 290 is actuated, to slide the driving member 200 of the clutch 202 in opposite directions along the shaft 166, by rolls 308, 310, respectively, which are carried by the multi-arm lever 34 and may be moved into engagement with a stud 312 (Figs. 1, 2 and 4) fixed to but mounted for adjustment upon the arm. When, by reason of the fact that the hand grips have been displaced 30°, for example, from neutral position and the bifurcated arm 290 has been swung by one or the other of the rolls 308, 310 into a position to increase the speed of rotation of the spool 228 by increasing the gear ratio of the rate control drive, the push-pull rod 194 which controls the speed of the hydraulic motor (not shown) will be displaced from a neutral position by approximately one inch, this being the maximum displacement of the rod for 30° displacement of the grips. The maximum displacement of the rod 194 causes the turret to rotate at a rate of 45° per second. The mechanism for varying the gear ratio of the rate control drive when the grips are displaced above 26⅔° may be referred to as sluing mechanism.

Because of the gear ratio between the gear segment 248 and the gear 246, initial displacement of the shaft 30 by only a few degrees will cause considerable angular displacement of the differential cage 240 which is secured to the shaft 232. Accordingly, when the grips are angularly displaced a few degrees about either of their axes of rotation, the push-pull rod 194 will be displaced in one direction or the other from its neutral position a maximum amount, that is, about one inch, with the result that the turret rotates quickly in the desired direction to pick up the target; the back feed gear 270, acting through the above described mechanism, causing the rod 194 to be moved back to its neutral position when the target has been reached, assuming that there is no rate control mechanism. In the above described aided tracking device the rate control mechanism causes rotation of the gear 266 of the differential 192, in a direction opposite to that of the back feed gear 270 and the back feed gear operating, through the differential 192 and the rod 194 closes the hydraulic motor control valve (not shown) until said back feed gear is moved at the same speed as the rate control gear 266 of the differential 192, the cage 190 remaining stationary when the speeds of the back feed gear 270 and the gear 266 move in opposite directions are the same thus causing the turret to rotate at a constant rate.

When the above described aided tracking mechanism is used in an electrically driven turret such as disclosed in said application Serial No. 30,328, there is provided the modified box 32a such as illustrated in Figs. 6 and 7 and corresponding to the box 32. In such a construction the differential 192 is omitted and the gear 266 is replaced by a gear 314 formed on a sleeve 316 rotatably mounted upon bearings (not shown) supported by the shaft 232.

In the modified construction shown in Figs. 6 and 7 there is secured by screws 318 (Fig. 7) to a flange of the sleeve 40 a gear segment 320 meshing with a gear segment 322 keyed to the shaft 232. Movement of the shaft 30, which is connected to the grips, causes rotation of a cage 324 (Figs. 6 and 7) of a differential 326, corresponding to the differential 241, directly through the gear segments 320, 322 and the shaft 232 and also through the above described rate control mechanism.

The sleeve 316 has formed integral with it a pair of gears 328, 330, the gear 328 meshing with a gear 332 secured to a shaft 334 of a Selsyn transmitter or generator Selsyn 336 (Fig. 6). The gear 330 is operatively connected through a gear train comprising gears 338, 340, 342, 344 and 346 to a shaft 347 (Fig. 6) of another Selsyn transmitter 348, the drives being such that the angular displacement of the Selsyn transmitter 348 is thirty-one times that of the Selsyn transmitter 336. In accordance with common practice such a pair of Selsyn transmitters are connected to Selsyn transformers or transformer Selsyns associated with azimuth or elevation motors such as disclosed in said application Serial No. 30,328.

When the grips are rotated to train the guns on the target the Selsyn differential cage 324 is rotated with the shaft 232 causing through mechanism above described a predetermined displacement of the Selsyn transmitters 336, 348 with the result that the motors (not shown) controlled by Selsyn transformers rotate until the Selsyn transmitters and transformers are in phase, at which time current applied to the motors would cease were there space but no rate control mechanism. In the present aided tracking mechanism, however, constant rotation of the sleeve 228 actuated by the rate control member causes constant rotation of a gear 350 of the differential 326, corresponding to the gear 234 of the differential 241 with the result that the Selsyn transmitters 326, 348 are continuously displaced causing the azimuth and elevation motors to be driven at rates determined by the displacement of the grips.

Having thus described our invention, what we claim as new and desire to secure by Letters Patent of the United States is:

1. In a rate control device, a disk rotatable about an axis and having a flat driving face arranged at right angles to said axis, means for rotating the disk at a constant speed, a pair of rotatable elements, a slide, a pair of ball drives which are mounted on the slide and are arranged in driving relation with said face of the disk at opposite sides respectively of the axis of rotation of said disk and which are arranged in driving relation with said elements, manually controlled means for moving the slide to cause the ball drives to move to different operative positions along said face with relation to said axis of rotation, mechanism for forcing with equalized pressure the face of the disk against the ball drives and the ball drives against said elements, a rate control transmitting member, and mechanism for moving said rate control transmitting member in a translatory path in response to rotation of said elements.

2. In a rate control device, a disk rotatable about an axis, means for rotating the disk at a constant speed about said axis, a slide movable in a path disposed approximately at right angles to said axis, said slide having two recesses extending generally lengthwise of said axis and arranged at opposite sides respectively of said axis, a pair of cylinders movable about a common axis disposed at right angles to the axis of rotation of the disk, two or more balls which fit in each of the recesses of said slide and are in driving engagement, a tilting plate upon which the disk is rotatably supported, a carrier, said tilting plate being pivotally supported upon the carrier for movement upon an axis extending approximately through and arranged at right angles to the axis of rotation of the disk, a spring acting upon said carrier for causing the disk to be forced against one of the balls in each of the recesses and for causing another of the balls in each of the recesses to be forced against an associated cylinder thereby causing the cylinders to rotate in opposite directions in response to rotation of the disk, a differential portions of which are operatively connected to the cylinders, and a rate control member operatively connected to said differential.

3. In a rate control device, a pair of rotatable members, a movable slide, a pair of drives which are carried by the slide and are spaced a substantial distance from each other and which are constructed and arranged to be forced against the respective members to effect rotation of the same, a disk which is rotatable about an axis and has a flat driving face, said disk being tiltable about an axis extending through and arranged at right angles to said axis, said disk also being tiltable about an axis which is disposed at right angles to the axis of rotation of the disk and which lies approximately in the plane of the driving face of said disk and beyond the outside limits of said face, means for forcing said face of the disk against said drives and for forcing the drives against said rotatable members, and a differential comprising input gears which are operatively connected to the rotatable members respectively.

4. In a rate control device, a disk having a flat driving face, a plate upon which the disk is mounted for rotation about an axis disposed at right angles to said face, said plate being mounted for tilting movement about an axis which is spaced from said face and which intersects and is arranged at right angles to said axis, a pair of rotatable members, a manually controlled slide, a pair of spaced driving units which are carried by the slide and are arranged at opposite sides of the axis of rotation of the disk, means for forcing the driving face of the disk against the driving units and said units against the rotatable members respectively to cause rotation of the disk to effect rotation of said rotatable members, a rate control transmitting element, and mechanism comprising a differential for moving said element in response to movement of the rotatable members.

5. In a rate control device, a pair of cylinders movable about a common axis, a power driven disk having a driving face, a slide movable generally lengthwise of the axis of rotation of the cylinders, a plate for supporting said disk for rotation about an axis, spaced ball drives which are arranged at opposite sides of said axis of rotation of the disk and which are carried by the slide and are constructed and arranged to be forced against the cylinders respectively, a carrier pivotally mounted for movement about an axis disposed approximately at right angles to the axis of rotation of the disk and lying approximately in the plane of and at one side of said driving face of the disk, said plate being mounted for pivotal movement upon the carrier about an axis extending through and disposed at right angles to the axis of rotation of the disk, resilient means for moving the carrier in one direction to force the disk against the ball drives and the ball drives against the cylinders thereby causing the said cylinders to be driven in opposite directions, and a differential which has gears operatively connected to the cylinders respectively.

6. In a rate control device, a disk which is rotatable about an axis and has a flat driving face disposed at right angles to said axis, said disk being bodily tiltable about an axis disposed at right angles to and intersecting the axis of rotation of the disk, said disk also being bodily movable about an axis which is spaced a considerable distance from its axis of rotation and which is arranged parallel to the second-named axis and lies substantially in the plane of the driving face of said disk, a pair of cylinders rotatable about a common axis, a manually controlled member movable lengthwise of the axis of rotation of the cylinders, driving units rotatably mounted in the slide and arranged at opposite sides of the axis of rotation of the disk, said units being in driving engagement with the face of the disk and said cylinders respectively to rotate said cylinders in opposite directions in response to rotation of the disk, a power regulating member, and means comprising a differential to which the cylinders are operatively connected for controlling the speed of said member in response to movement of the cylinders.

7. In a rate control device, a continuously driven member which is rotatable at a constant speed and has a driving face, a pair of drives, manually controlled means for moving the drives into engagement with different portions of the face of said member to vary the speeds of said drives, a movable power regulating element, mechanism for operatively connecting the drives to said element, said mechanism comprising a pair of shafts, alternately effective sets of gears mounted upon said shafts and a clutch shiftable to render effective one of the other of said sets of gears to vary the speed ratio of said shafts, and a shifter which is operatively connected to the manually controlled means and also to the clutch to cause one of said sets of gears of said mechanism to be rendered operative when said manually controlled means has been moved beyond a predetermined position.

LLOYD G. MILLER.
ERNEST W. STACEY.

REFERENCES CITED

The following references are of record in the file of this patent:

UNITED STATES PATENTS

| Number | Name | Date |
| --- | --- | --- |
| 1,172,503 | Trufant | Feb. 22, 1916 |
| 1,626,611 | James | May 3, 1927 |
| 2,357,035 | Treese | Aug. 29, 1944 |
| 2,422,306 | Laing | June 17, 1947 |